United States Patent Office 3,529,007
Patented Sept. 15, 1970

---

3,529,007
NEW ORGANOSILICON COMPOUNDS, THEIR PREPARATION AND THEIR USE
Pierre Brison, Oullins, Rhone, and Marcel Lefort, Caluire, Rhone, France, assignors to Rhone-Poulenc S.A., Paris, France, a French body corporate
No Drawing. Filed Aug. 28, 1967, Ser. No. 663,548
Claims priority, application France, Sept. 8, 1966, 75,740
Int. Cl. C07f 7/18
U.S. Cl. 260—448.8       6 Claims

ABSTRACT OF THE DISCLOSURE

Organosilicon compounds containing a β-hydroxyalkyl group and useful inter alia as lubricants or coating are prepared by reacting a silicon compound containing a silicon-hydrogen bond with a vinyloxysilane in the presence of an initiator and then hydrolysing or alcoholysing the products obtained, which are new compounds themselves useful as impregnating agents.

---

This invention relates to the preparation of organosilicon compounds containing β-hydroxyalkyl radicals using new intermediates containing β-siloxyalkyl radicals.

It has already been proposed to prepare monosilanes having β-hydroxyethyl radicals from silanes which already have a radical with two carbon atoms. Thus the preparation of β-hydroxyethyltriethylsilane from tetraethylsilane via β-chlorethyltriethylsilane and β-acetoxyethyltriethylsilane has been described, but the yield of the final product is very low (Niedzielski, J. Amer. Soc. 62, 3519 (1949)). The standard reaction of hydroboration of olefines (Seyferth, J. Amer. Chem. Soc. 81, (1959)), which consists of addition of diborane to the olefine followed by oxidation in an alkaline medium, has also been applied to trialkylvinylsilanes. However this process can only be used within a very restricted field because of the incompatibility of the diborane or of its precursors with the presence of hydrolysable substituents on the silicon atom.

It has also been proposed (Belgian patent specification No. 559,691) to prepare polysiloxanes with a β-hydroxyethyl radical by bonding chlorohydrogenosilanes to vinyl acetate followed by hydrolysing the Si-Cl bonds and the acetate group.

It is also known that polysiloxanes with a γ-hydroxypropyl function can be obtained by addition of silanes or siloxanes to the Si-H bond of trimethylallyloxysilane followed by hydrolysis of the addition product. (Greber and Jager, Die Makromolekulare Chemie, 57, 150 (1962)).

A new process for the preparation of organosilicon compounds with β-hydroxyalkyl radicals has now been found. The first step consists of reacting a silicon compound having a silicon-hydrogen bond, in the presence of a catalyst, with a vinyloxysilane, in accordance with the equation:

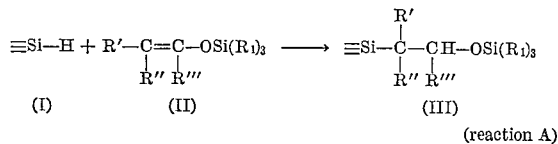

(reaction A)

The products of this step, organosilicon compounds containing a β-siloxyalkyl radical, are new, and as such within the scope of the invention. In the second step, the compound (III) obtained in reaction A is hydrolysed or alcoholysed in accordance with the equation:

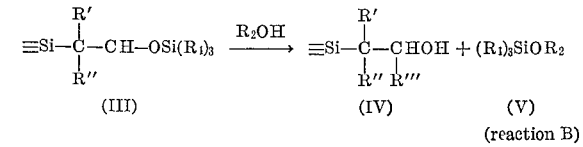

(reaction B)

In the preceding equations, R₂ represents a hydrogen atom or the residue of a lower saturated aliphatic alcohol and the other symbols have the significance given hereafter.

Reaction A may be carried out with any organosilicon compound having Si-H bonds. These compounds may either contain one or several silicon-hydrogen bonds. In compounds having more than one silicon-hydrogen bond, the hydrogen atoms may be distributed over a number of silicon atoms equal to or less than the number of hydrogen atoms, but compounds which do not contain more than one silicon-hydrogen bond on a single silicon atom are preferred. The compounds may be monosilanes, polysilanes, polysilylalkanes, polysiloxanes or organocyclopolysiloxanes. The silicon atoms of these organosilicon compounds may carry any hydrocarbon groups free of multiple bonds other than those of an aromatic type. In particular, they may carry alkyl radicals having 1 to 4 carbon atoms, saturated alicyclic radicals having 3 to 6 carbon atoms in the ring, aryl radicals, in particular phenyl radicals and phenyl radicals substituted by alkyl radicals having 1 to 4 carbon atoms, and aralkyl radicals, particularly phenylalkyl radicals. These various hydrocarbon groups may be substituted by inert substituents such as halogen atoms such as chlorine or fluorine or by functional groups such as nitrile groups. The compounds may also contain hydrolysable atoms or functional groups such as a chlorine atom or an alkoxy or acyloxy group directly attached to silicon.

By way of illustration, the following types of compounds may be used:

(1) Hydrogenosilanes of the general formula:

$$H\ Si(R)_x(X)_{3-x} \qquad (VI)$$

in which R represents an optionally substituted hydrocarbon group such as one of those mentioned above, $x$ represents an atom or functional group as indicated above, and $x$ is 0, 1, 2 or 3. Preferred such compounds are those in which R is alkyl of 1 to 4 carbon atoms, especially methyl, alkoxy of 1 to 4 carbon atoms, especially ethoxy, or phenyl, X is chlorine or bromine and $x$ is 0, 1, 2 or 3. Specific compounds of Formula VI include trimethylsilane, methyldiphenylsilane, methyldichlorosilane, dimethylchlorosilane, trichlorosilane, 1-chlorethyldichlorosilane, ethyldichlorosilane, ethoxydichlorosilane, chloromethyldimethylsilane, methylethoxychlorosilane, trimethoxysilane, methyldiacetoxysilane, phenyldiacetoxysilane, dimethyl(dichlorocyclopropyl)silane and dibenzylethoxysilane.

(2) Disilylalkanes such as those of the formula:

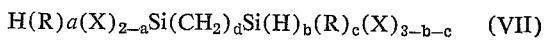

in which R and X are defined as above, $a$ is 0, 1 or 2, $b$ is 0 or 1, and $c$ is 0, 1, 2 or 3, the sum $b+c$ being less than 3, and $d$ represents an integer. Examples of such compounds are trimethylsilyldichlorosilylmethane, 1-ethyldichlorosilyl - 3 - dichlorosilyl-propane, and 1,4-bis(dimethylsilyl)butane.

(3) Linear polysiloxanes, either: (a) of low molecular weight such as the compounds of formula:

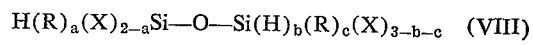

in which the symbols R, X, $a$, $b$ and $c$ are defined as above, or ($b$) of medium or high molecular weight and consisting of units which may be made up of radicals such as $(R)_3SiO_{0.5}$, $(R)_2SiO$, $(R)HSiO$ and $(R)_2HSiO_{0.5}$, in which the symbols R, which may be identical or different, represent monovalent hydrocarbon radicals such as those mentioned above.

(4) Cyclic organopolysiloxanes such as, for example, 1,3,5 - trimethyltrihydrogenocyclotrisiloxane, 1,3,5,7-tetramethyl-tetrahydrogenocyclotetrasiloxane, 1,3,5,7,9-pentamethyl-pentahydrogenocyclopentasiloxane and 1,3,5 - triphenyl-trihydrogenocyclotrisiloxane.

(5) Branched polysiloxanes which may be homopolymers or copolymers containing units such as $(R)_3SiO_{0.5}$, $(R)_2SiO$, $(R)HSiO$, $(R)_2HSiO_{0.5}$, $RSiO_{1.5}$ and $HSiO_{1.5}$ in which the symbols R, which may be identical or different, represent monovalent hydrocarbon radicals such as those mentioned above. These polysiloxanes may, for example, be hydrolysis products of trifunctional silanes or cohydrolysis products of difunctional silanes and trifunctional silanes.

The organosilicon compound having an optionally substituted vinyloxy group directly bonded to a silicon atom, may be a silane, a polysiloxane or a polysilylalkane. However the invention more particularly involves the use of vinyloxysilanes which are optionally substituted in the vinyl group and, amongst these, the compounds of the general formula:

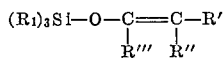

in which each $R_1$ represents a saturated or aromatically unsaturated hydrocarbon radical such as one of those mentioned above or an alkoxy, cycloalkoxy, aryloxy or aralkoxy group, and R', R'' and R''' each represent a hydrogen atom or an inert organic radical, which may be linked, especially a hydrocarbon radical which is saturated or aromatically unsaturated, or two of the radicals R', R'' and R''' together form a divalent radical such as a polymethylene chain which is optionally substituted by one or more hydrocarbon radicals such as those mentioned above or by functional groups which are inert under the working conditions. The symbols R' and R'' may furthermore each represent a group which is inert under the working conditions. Preferably $R_1$ is alkyl of 1 to 4 carbon atoms, especially methyl, or phenyl, R' and R'' are both hydrogen, and R''' is hydrogen or alkyl of 1 to 4 carbon atoms.

Some of these vinyloxysilanes may be prepared by reacting α-ethylenic aldehydes or ketones with hydrogenosilanes in the presence of chloroplatinic acid or by reacting chlorosilanes with aldehyde or ketone compounds which have previously been converted into alkali metal or mercuric derivatives. A more advantageous process which may be used for preparing any of the vinyloxysilanes consists of reacting an organosilane having a chlorine-silicon bond directly with an enolisable aldehyde or ketone, the process being, as described in French patent specification No. 1,436,568, carried out in the presence of zinc chloride and of a reagent capable of neutralising the hydrogen chloride gas which forms during the reaction.

The addition of the organosilicon compounds having a silicon-hydrogen bond to the vinyloxysilanes is carried out in the presence of an initiator which may be, e.g., an organic peroxide, ultra-violet radiation, or a compound based on nickel or, more preferably platinum. Amongst the latter, chloroplatinic acid is preferably used in relatively small amounts, of the order of 0.01 g. to 0.1 g. per Si-H bond employed.

It is theoretically sufficient to use one mol of a compound with a Si-H bond per mol of vinyloxysilane. In practice, reagent proportions close to the theoretical proportions are generally used, but an excess of one of the reagents is not prejudicial to the reaction. When the mixture of reagents is heterogeneous or excessively viscous it may be advantageous to carry out the reaction in an organic solvent which is inert under the working conditions. Linear or cyclic ethers, and aliphatic or aromatic hydrocarbons, which may or may not be halogenated, are very suitable for this purpose.

In order to carry out the reaction, the reagents, the initiator and optionally the solvent are mixed and heated to a suitable temperature for the reaction to take place. This temperature may vary depending on the reactivity of the compounds in question and on their volatility, but the most satisfactory working conditions for each particular case can be easily found. Generally, the optimum temperature range for each specific case is between 10° and 175° C.

Since the reaction consists of a simple addition of the compound with a Si-H bond to the vinyloxysilane it is possible, when this reaction has been carried out, to subject the resulting mixture, optionally after separating off unreacted products, directly to the second reaction which liberates the alcohol function. It is also possible, before carrying out this treatment, to purify the intermediate organosilicon compound having a β-siloxyalkyl radical, for example by distilling it when it contains few silicon atoms.

As has been stated above, the treatment which liberates the OH function may be an alcoholysis or a hydrolysis. The choice of means used depends on the nature of the substituents carried by the starting compound with a Si-H bond. As a general rule, the alcoholysis reaction can be used with any compound which does not contain hydrolysable atoms or functional groups or contains hydrolysable functional groups which give no, or practically no, side reactions with the alcohol used. This alcoholysis reaction is especially valuable for the preparation of organosilicon compounds with a β-hydroxyalkyl radical which also contain alkoxy groups, these being compounds which it has not previously been possible to prepare. The reaction is generally carried out without a catalyst, for example by heating a solution of the addition compound of Formula III in a volatile alcohol such as methanol or ethanol under reflux for several hours.

Any compound of Formula III may be hydrolysed. Where the compound with a Si-H bond (I) contains neither a hydrolysable atom nor a hydrolysable functional group, the structure of the final compound of Formula IV corresponds exactly to that of the initial compound of Formula I. Where on the other hand this initial compound contains silicon atoms directly bonded to halogen atoms such as chlorine, or to functional groups such as alkoxy, aryloxy or acyloxy groups, these atoms or groups undergo hydrolysis at the same time as the β-siloxyalkyl function. Depending on the number and position of these atoms or functional groups, the process of the invention thus produces organosilicon compounds with a β-hydroxyalkyl radical which contain monofunctional, difunctional or trifunctional siloxane units.

It should be understood that the process includes the case where the addition compound of Formula III is hydrolysed in the presence of other organosilicon compounds. A particularly important form of the process consists of cohydrolysing the compound of Formula III having hydrolysable atoms or groups directly linked to silicon atoms, principally chlorine atoms, with hydrolysable silicon compounds such as chlorosilanes or polysiloxanes which have Si-Cl bonds. The cohydrolysable compound preferably has the formula:

where $R_3$ is alkyl of 1 to 4 carbon atoms or phenyl, X is chlorine or bromine, and y is 1, 2 or 3.

The hydrolysis or cohydrolysis of the compound of Formula III may be carried out at ambient temperature (25° C.) or even below, for example at or just above 0° C., in the presence or absence of an inorganic acid as catalyst. Where the addition Compound III has silicon atoms directly bonded to halogen atoms and more particularly to chlorine atoms, the addition of inorganic acid is not necessary because the hydracid liberated then acts as catalyst for the hydrolysis of the β-siloxyalkyl function.

The process of the invention makes it possible to prepare organosilicon compounds with a β-hydroxyalkyl radical which have very diverse structures. These compounds may be silanes or linear or cyclic polysiloxanes which look like an oil, or also crosslinked polysiloxanes of a resinous nature. Depending on their nature, these products can, for example, be used as lubricants or in coating compositions. They can also serve for the production of polycondensates by reaction with polyacids or with polyisocyanates.

The organosilicon compounds with a β-siloxyalkyl radical, of Formula III, are, as already stated, new compounds. Apart from being intermediates for the preparation of organosilicon compounds having a β-hydroxyalkyl radical, they can also be used in impregnating compositions.

The following examples illustrate the invention.

EXAMPLE 1

A mixture containing 98 g. of dimethylchlorosilane, 116 g. of vinyloxytrimethylsilane and 0.7 cm.³ of a 10% strength solution of chloroplatinic acid in isopropanol is heated at the boil for 80 minutes. The boiling point rises progressively from 51° to 120° C. After cooling, 175 g. of a fraction boiling between 65° C. and 67.5° C. under reduced pressure (13 mm. Hg) are isolated by distillation. This material consists of 1-dimethylchlorosilyl-2-trimethylsiloxyethane of formula:

$$Cl(CH_3)_2SiCH_2CH_2OSi(CH_3)_3$$

A solution consisting of 106 g. of 1-dimethylchlorosilyl-2-trimethylsiloxyethane, 165 g. of trimethylchlorosilane and 300 cm.³ of diethyl ether is introduced into a mixture of 500 g. of ice and 300 cm.³ of diethyl ether over the course of 15 minutes, with stirring, while the temperature is maintained below 20° C. Stirring is continued for a further 3 hours at ambient temperature (25° C.) and the ether layer is then decanted, washed with water until neutral, dried and distilled. In this way, 67 g. of 1,1,1-trimethyl-3,3-dimethyl-3-(β-hydroxyethyl)-disiloxane, $(CH_3)_3Si-O-Si(CH_3)_2CH_2CH_2OH$, B.P.=50° C./0.25 mm. Hg, $n_d^{20}=1.4150$, and $d_4^{20}=0.8735$, and 9 g. of 1,1,3,3-tetramethyl-1,3-bis(β-hydroxyethyl)disiloxane, $O[Si(CH_3)_2CH_2CH_2OH]_2$, B.P.=112°–113° C./0.5 mm. Hg, $n_d^{20}=1.4430$, and $d_4^{20}=0.966.5$, are obtained.

EXAMPLE 2

130 g. of isopropenyloxytrimethylsilane, 48 g. of dimethylchlorosilane and 1 cm.³ of the chloroplatinic acid solution described in Example 1 are mixed, and the mixture heated to boiling, which starts at 63.5° C. When the reaction temperature reaches 88° C., the mixture is distilled and 27 g. of unreacted dimethylchlorosilane and 98 g. of unreacted isopropenyloxysilane are collected, followed by 45 g. of 1-dimethylchlorosilyl-2-trimethylsiloxypropane, $$Cl(CH_3)_2SiCH_2CH(CH_3)OSi(CH_3)_3$$

which distils between 74° C. and 76° C. under reduced pressure (14 mm. Hg).

20 g. of this compound and 40 g. of trimethylchlorosilane are dissolved in 200 cm.³ of diethyl ether and the solution obtained is introduced into 100 g. of vigorously stirred iced water over the course of 1 hour. After completion of the addition, stirring is continued for 4 hours at ambient temperature (25° C.) and the ether phase is then decanted, washed, dried and distilled. In this way, 16 g. of 1,1,1-trimethyl-3,3-dimethyl-3-β-hydroxypropyl-disiloxane, $$(CH_3)_3SiOSi(CH_3)_2CH_2CH(CH_3)OH$$

B.P.=45°–46° C./0.15 mm. Hg, $d_4^{20}=0.8702$, and $n_d^{20}=1.4165$, are collected.

EXAMPLE 3

82 g. of triethoxysilane are mixed with 58 g. of vinyloxytrimethylsilane and 1 cm.³ of the chloroplatinic acid solution used in Example 1 and the mixture is heated under reflux until the reaction temperature reaches 152° C. The mixture is then distilled as in the preceding examples and the fraction of B.P.=84°–85° C./1.3 mm. Hg is retained. This consists of 84 g. of 1-triethoxysilyl-2-trimethylsiloxyethane, $(H_5C_2O)_3SiCH_2CH_2OSi(CH_3)_3$, $n_d^{20}=1.4070$, and $d_4^{20}=0.914$.

25 g. of this compound are dissolved in 60 g. of absolute ethanol and the solution is heated at the boil for 30 minutes. The excess ethanol is then distilled, as is the ethoxytrimethylsilane formed, first at atmospheric pressure and then in a progressively better vacuum. Finally 17 g. of triethoxy-β-hydroxyethylsilane, $$(H_5C_2O)_3SiCH_2CH_2OH$$

$n_d^{20}=1.4332$, and $d_4^{20}=1.060$, remain.

EXAMPLE 4

A mixture containing 120 g. of methyldichlorosilane, 120 g. of vinyloxytrimethylsilane and 0.6 cm.³ of the chloroplatinic acid solution used in Example 1 is heated progressively. The reaction starts rapidly at 50° C. and the temperature rises to 130° C. within 30 minutes. The fraction of B.P.=74–75° C./15 mm. Hg, which consists of 200 g. of 1-methyldichlorosilyl-2-trimethylsiloxyethane, $Cl_2CH_3SiCH_2CH_2OSi(CH_3)_3$, is isolated by distillation.

129 g. of dimethyldichlorosilane, 11 g. of trimethylchlorosilane and 300 cm.³ of diethyl ether are added to 116 g. of this product, and the resulting solution is then introduced, over the course of 1 hour, into a mixture of 500 g. of ice and 300 cm.³ of diethyl ether while the temperature is maintained below 12° C. The organic layer is decanted, washed with water until neutral and dried. After distilling off the ether, the residue is heated under a progressively applied vacuum until it reaches 80° C. under a reduced pressure of 0.3 mm. Hg 16 g. of volatile products are removed. 111 g. of a limpid oil, having a viscosity of 56 cst. at 20° C. and containing 13% by weight of β-hydroxyethyl radicals, remain.

EXAMPLE 5

73 g. of phenyldichlorosilane are added to 48 g. of vinyloxytrimethylsilane containing 0.5 cm.³ of the chloroplatinic acid solution used in Example 1. The temperature rises rapidly from 23° C. to 138° C. The mixture is left standing for several hours and then distilled. The fraction of B.P.=101°–103° C./0.5 mm. Hg, which consists of 62 g. of 1-phenyldichlorosilyl-2-trimethylsiloxyethane, $Cl_2C_6H_5SiCH_2CH_2OSi(CH_3)_3$, is isolated.

58.6 g. of this product are cohydrolysed with 25.8 g. of dimethyldichlorosilane and 2.2 g. of trimethylchlorosilane whilst working as in Example 5, and an oil containing methyl, phenyl and β-hydroxyethyl radicals is obtained.

We claim:

1. An organosilicon compound of the formula:

$$R_xCl_{3-x}SiCH_2CHR'''OSi(CH_3)_2$$

in which R''' is hydrogen or methyl, and R is ethoxy or phenyl when x is 1, 2 or 3 or is methyl when x is 1 or 2.

2. The compound as claimed in claim 1 of formula:

$$Cl(CH_3)_2SiCH_2CH_2OSi(CH_3)_3$$

3. The compound as claimed in claim 1 of formula:

$$Cl(CH_3)_2SiCH_2CH(CH_3)OSi(CH_3)_3$$

4. The compound as claimed in claim 1 of formula:

$$(H_5C_2O)_3SiCH_2CH_2OSi(CH_3)_3$$

5. The compound as claimed in claim 1 of formula:

$$Cl_2CH_3SiCH_2CH_2OSi(CH_3)_3$$

6. The compound as claimed in claim 1 of formula:

$$Cl_2C_6H_5SiCH_2CH_2OSi(CH_3)_3$$

References Cited

UNITED STATES PATENTS

| | | | |
|---|---|---|---|
| 2,821,873 | 10/1955 | Mackenzie et al. | 260—448.2 |
| 2,823,218 | 2/1958 | Speier et al. | 260—448.8 X |
| 2,851,473 | 9/1958 | Wagner et al. | 260—448.8 X |
| 2,970,150 | 1/1961 | Bailey | 260—448.8 X |
| 3,083,219 | 3/1963 | Anderson | 260—448.8 |
| 3,159,662 | 12/1964 | Ashby | 260—448.8 X |
| 3,450,737 | 6/1969 | Colleville | 260—448.8 |
| 3,453,307 | 7/1969 | Nitzsche et al. | 260—448.8 |

TOBIAS E. LEVOW, Primary Examiner

P. F. SHAVER, Assistant Examiner

U.S. Cl. X.R.

106—12; 252—49.6; 260—46.5, 448.2